(12) United States Patent
Priebsch

(10) Patent No.: US 6,314,054 B1
(45) Date of Patent: Nov. 6, 2001

(54) APPARATUS FOR DETECTING OBJECTS

(75) Inventor: Hans Dieter Priebsch, Bissingen (DE)

(73) Assignee: Leuze Electronic GmbH & Co., Owen/Teck (DE)

( * ) Notice: Subject to any disclaimer, the term of this patent is extended or adjusted under 35 U.S.C. 154(b) by 0 days.

(21) Appl. No.: 09/565,498

(22) Filed: May 5, 2000

(30)   Foreign Application Priority Data

May 7, 1999 (DE) .............................................. 199 21 217
Jun. 18, 1999 (DE) .............................................. 199 27 865

(51) Int. Cl.⁷ .................................................. G01S 15/00
(52) U.S. Cl. ........................... 367/93; 271/263; 340/511; 340/674
(58) Field of Search .................................... 340/674, 673, 340/686.1, 511; 367/13; 73/1.79; 283/81; 271/263; 101/DIG. 30, DIG. 36; 198/341.05, 341.07, 341.03, 340, 502.3, 502.2

(56)   References Cited

U.S. PATENT DOCUMENTS

| | | | |
|---|---|---|---|
| 4,066,969 | 1/1978 | Pearce et al. ........................ | 367/125 |
| 4,368,438 | 1/1983 | Stienstra ................................. | 331/14 |
| 5,348,286 | 9/1994 | Buck ..................................... | 271/263 |
| 5,458,728 | 10/1995 | Galchefski ............................ | 156/566 |
| 5,823,693 | * 10/1998 | Henderson ............................ | 400/611 |
| 5,978,004 | * 11/1999 | Ehrhardt ............................ | 101/288 X |

FOREIGN PATENT DOCUMENTS

| | | |
|---|---|---|
| 3620042 | 1/1987 | (DE) . |
| 195 21 129 | * 10/1996 | (DE) . |

* cited by examiner

Primary Examiner—Thomas Mullen
(74) Attorney, Agent, or Firm—Venable; Robert Kinberg

(57)   ABSTRACT

An apparatus for detecting labels on a carrier material has a transmitter that emits ultrasonic waves and a receiver that receives ultrasonic waves. The carrier material is located, with the labels, between the transmitter and the receiver. For detecting the labels, the received signal is compared to a threshold value at the output of the receiver. The threshold value is determined automatically, as a function of the received signal registered during a balancing procedure when the carrier material and/or labels are located between the transmitter and the receiver. In an alternative embodiment of the invention, the apparatus is used to distinguish between single and multiple sheets.

27 Claims, 3 Drawing Sheets

APPARATUS FOR DETECTING OBJECTS

CROSS-REFERENCE TO RELATED APPLICATIONS

Priority is claimed with respect to application No. 199 21 217.1 filed in Germany on May 7, 1999, and application No. 199 27 865.2-27 filed in Germany on Jun. 18, 1999, the disclosures of which are incorporated herein by reference.

BACKGROUND OF THE INVENTION

The invention relates to an apparatus for detecting objects formed by labels on a carrier material, and sheets, particularly sheets of paper.

An apparatus of this type is known from German Patent DE-PS 195 21 129. This apparatus includes a capacitive sensor having two adjacent capacitor elements, which are spaced from one another opposite a capacitor plate. The carrier material with the labels is guided in the air gap between the capacitor plate and the capacitor elements.

For detecting the labels on the carrier material, a timing element that generates a pulse sequence and a low-pass filter are disposed downstream of each capacitor element. The outputs of the low-pass filters are guided to the inputs of a differential amplifier. This circuit can detect labels on the carrier material, even if the labels and the carrier material comprise transparent materials.

A disadvantage, however, is that such apparatuses are extremely sensitive to temperature influences, and humidity in particular. They also encounter difficulties in detecting metallized materials. Furthermore, the two capacitor elements can only detect the signal flanks occurring in the detection of a label edge. A prerequisite of this is that the labels and the carrier material be moved past the capacitor elements at a predetermined speed. Static detection with a stationary carrier material is not possible. A further drawback is that a reliable label detection is only possible if the label edges travel along a straight line transverse to the transport direction of the carrier material, so that an at least approximately constant spacing between adjacent labels must be maintained over the label width.

SUMMARY OF THE INVENTION

It is an object of the invention to provide an apparatus of the type mentioned at the outset to assure the reliable detection of labels on carrier materials, and sheets, for the broadest material spectrum.

The above and other objects are accomplished in accordance with a first embodiment of the invention by the provision of an apparatus for detecting objects each of which is composed of a label applied to a carrier, the apparatus comprising: a transmitter for emitting ultrasonic waves; a receiver for receiving ultrasonic waves spaced apart from the transmitter so that the objects can be passed between the transmitter and the receiver, the receiver producing an output signal representing an attenuation of ultrasonic waves when one of the objects is between the transmitter and receiver; means for comparing the receiver output signal with a threshold value in order to detect the label; and balancing means for automatically determining the threshold value as a function of a received signal registered during a balancing procedure when a segment including at least one of the carrier material and the label is located between the transmitter and the receiver.

Thus, according to the first embodiment of the invention, the apparatus is used to detect labels on a carrier material, and has a transmitter that emits ultrasonic waves and a receiver that receives ultrasonic waves. The carrier material is guided, with the labels, in the space between the transmitter and the receiver. The ultrasonic waves are attenuated in various ways, depending on whether they detect the carrier material alone, or a label applied to the carrier material, between the transmitter and the receiver. The corresponding differences in the received signal are detected at the receiver output through the comparison of the received signal to a threshold value. This threshold value is adapted to the occurring level of the received signals in the balancing procedure. In the balancing procedure, which is performed prior to the detection of the labels, the magnitude of the threshold value is determined automatically as a function of the received signal registered when the carrier material and/or a label is or are located between the transmitter and the receiver.

The ultrasonic waves can be used to detect labels on the carrier material, virtually independently of the nature of the label material. In particular, labels on carrier materials can even be recognized if the labels are transparent or have metallized surfaces. The apparatus of the invention can reliably detect even very thin labels. A notable advantage is that the apparatus of the invention is not susceptible to environmental influences, such as humidity or temperature fluctuations.

A further advantage is that the apparatus of the invention can recognize labels on the carrier material regardless of whether the carrier material is moved relative to the apparatus. Finally, the apparatus of the invention advantageously recognizes the entire surface of the labels, not merely their edges. Hence, labels having virtually arbitrary edge contours can be recognized.

According to another embodiment of the invention there is provided an apparatus for detecting sheets and to distinguish between single and multiple sheets, the apparatus comprising: a transmitter for emitting ultrasonic waves; a receiver for receiving ultrasonic waves spaced apart from the transmitter so that sheets can be passed between the transmitter and the receiver, the receiver producing an output signal representing an attenuation of ultrasonic waves when one or more sheets is between the transmitter and receiver; means for comparing the receiver output signal with a threshold value at an output of the receiver in order to distinguish between single and multiple sheets; and balancing means for automatically determining the threshold value as a function of a received signal registered during a balancing procedure when at least one of the sheets is located between the transmitter and the receiver.

According to the second embodiment of the invention, the apparatus is used to detect sheets, particularly paper sheets, and distinguishes between single sheets and multiple sheets formed from a plurality of superposed sheets.

The apparatus according to the invention thus serves to distinguish between different sheet layer thickness, and, in an especially advantageous embodiment of the invention, is used for checking sheets in printing presses.

A problem in the printing-press application is that sheets must be drawn individually from a stack at the entrance of the press so that they can be supplied individually and consecutively to the printing group of the press. If a double sheet or multiple sheets are fed into the press, as opposed to a single sheet, this can damage the press.

The apparatus of the invention employs a transmitter that emits ultrasonic waves to distinguish such multiple sheets from single sheets with high detection reliability, regardless of the nature of the sheet material.

A significant advantage of the apparatus of the invention is that a frequency modulation of the ultrasonic waves prevents the formation of standing waves of the ultrasonic waves between the transmitter and the receiver, thus avoiding interferences that would skew the measured values.

BRIEF DESCRIPTION OF THE DRAWINGS

The invention is described below in conjunction with the drawings, which show in.

DETAILED DESCRIPTION OF THE INVENTION

Figure 1:
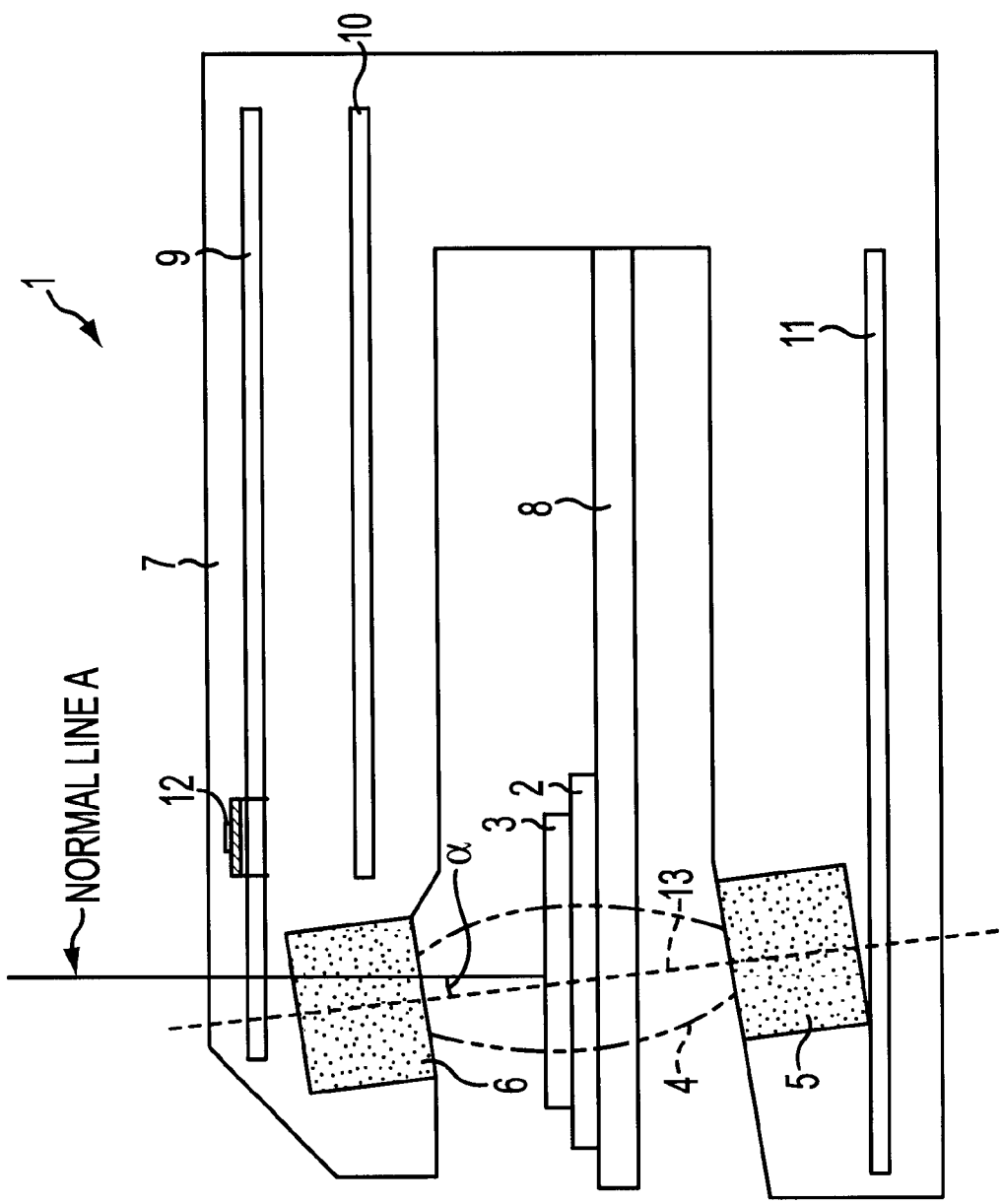
FIG. 1, a cross-section through the apparatus of the invention, which is integrated into a housing.

FIG. 1 illustrates the structure of an apparatus 1 for detecting labels 3 applied to a carrier material 2. As an alternative, apparatus 1 serves to detect sheets which, in the present example, are formed from paper sheets. Apparatus 1 may be located at the entrance of a printing press, not shown. The sheets are drawn individually from a stack, also not shown, so that they are fed individually into the press. In the event of an error, two or more sheets are simultaneously drawn from the stack and fed into the press as a multiple sheet.

To avoid damage to the printing press, apparatus 1 of the invention distinguishes single sheets from multiple sheets. If the apparatus 1 detects a multiple sheet, it emits a signal to a central control unit (not shown), which shuts down the press.

Referring to FIG. 1, there is shown an apparatus 1 that includes a transmitter 5 for emitting ultrasonic waves 4 and a receiver 6 for receiving ultrasonic waves 4. Both are accommodated in a housing 7. Housing 7 is embodied in the manner of a fork, with the two arms of the fork extending parallel and with space therebetween. Transmitter 5 and receiver 6 are respectively disposed in opposite fork arms. The strip-type carrier material 2 with applied labels 3 is transported in the longitudinal direction between the fork arms. The carrier material 2 lies on a bearing rod 8 in the space between the fork arms, and is conveyed transversely to bearing rod 8 by a drive device, not shown. Transmitter 5 and receiver 6 are respectively disposed above and below the carrier material 2, so the ultrasonic waves 4 emitted by transmitter 5 penetrate carrier material 2 and labels 3 that are present, and travel to receiver 6.

Labels 3 are applied to carrier material 2 one behind the other in the longitudinal direction, with predetermined spacing.

Transmitter 5 and receiver 6 are connected to a respective evaluation circuit, which is integrated onto a plurality of circuit boards 9, 10, 11 inside housing 7. A teach-in or programming key 12 that can be actuated from outside of the housing 7 is also connected to one of the circuit boards, for example circuit board 9.

For detecting labels 3 on carrier material 2, the attenuation of ultrasonic waves 4 impacting receiver 6, as affected by labels 3, is evaluated. For this purpose, the received signal is compared, at the output of receiver 6, to a threshold value S1. The threshold value S1 is determined in a balancing (calibrating) procedure prior to the actual detection of labels 3. During the balancing procedure, a received signal is registered when a segment of carrier material 2 is located between transmitter 5 and receiver 6, and the magnitude of the threshold value S1 is determined from this. In principle, it is also conceivable to perform a balancing procedure in which the received signal is evaluated when a label 3, with or without a segment of carrier material 2, is disposed between transmitter 5 and receiver 6.

Transmitter 5 emits ultrasonic waves 4, which are typically in a frequency range between 200 KHz and 400 KHz, along a beam axis. Receiver 6 lies in the beam axis 13 of ultrasonic waves 4.

Carrier material 2 with labels 3 lies horizontally in the space between the arms of fork-shaped housing 7. If transmitter 5 and receiver 6 were disposed in the direction of the surface normals of carrier material 2, the danger would exist that standing ultrasonic waves 4 would be formed between transmitter 5 and receiver 6, which would lead to the occurrence of interferences. This would impede the detection of labels 3.

To avoid such interferences in ultrasonic waves 4, transmitter 5 and receiver 6 are disposed at a diagonal in housing 7, so beam axis 13 of ultrasonic waves 4 extends at a predetermined angle α with respect to the surface normals of carrier material 2. In the present embodiment, this angle α is in a range of about $5° \leq \alpha \leq 10°$. Consequently, interference-stipulated minima and maxima of ultrasonic waves 4 are partially evened out.

For completely suppressing the interferences of ultrasonic waves 4, transmitter 5 is frequency-modulated with a predetermined modulation frequency υ in a range of 2 KHz $\leq \upsilon \leq$ 5 KHz.

Without this frequency modulation, interferences of ultrasonic waves 4 could also be suppressed by the selection of the angle of inclination α to be larger, for example, about 40°. In the event that apparatus 1 is used to detect sheets, the attenuation of ultrasonic waves 4 impacting receiver 6, as affected by the sheets, is evaluated for distinguishing an individual sheet from a double sheet. For this purpose, the received signal is compared to threshold value S1 at the output of receiver 6. Threshold value S1 is again, determined in a balancing procedure prior to the actual detection of the sheets. During the balancing procedure, the received signal is registered when an individual sheet 2 is located between transmitter 5 and receiver 6, and the magnitude of the threshold value S1 is determined from this. In principle, it is also conceivable to perform a balancing procedure in which the received signal is evaluated when a double sheet is located between transmitter 5 and receiver 6.

Figure 2:
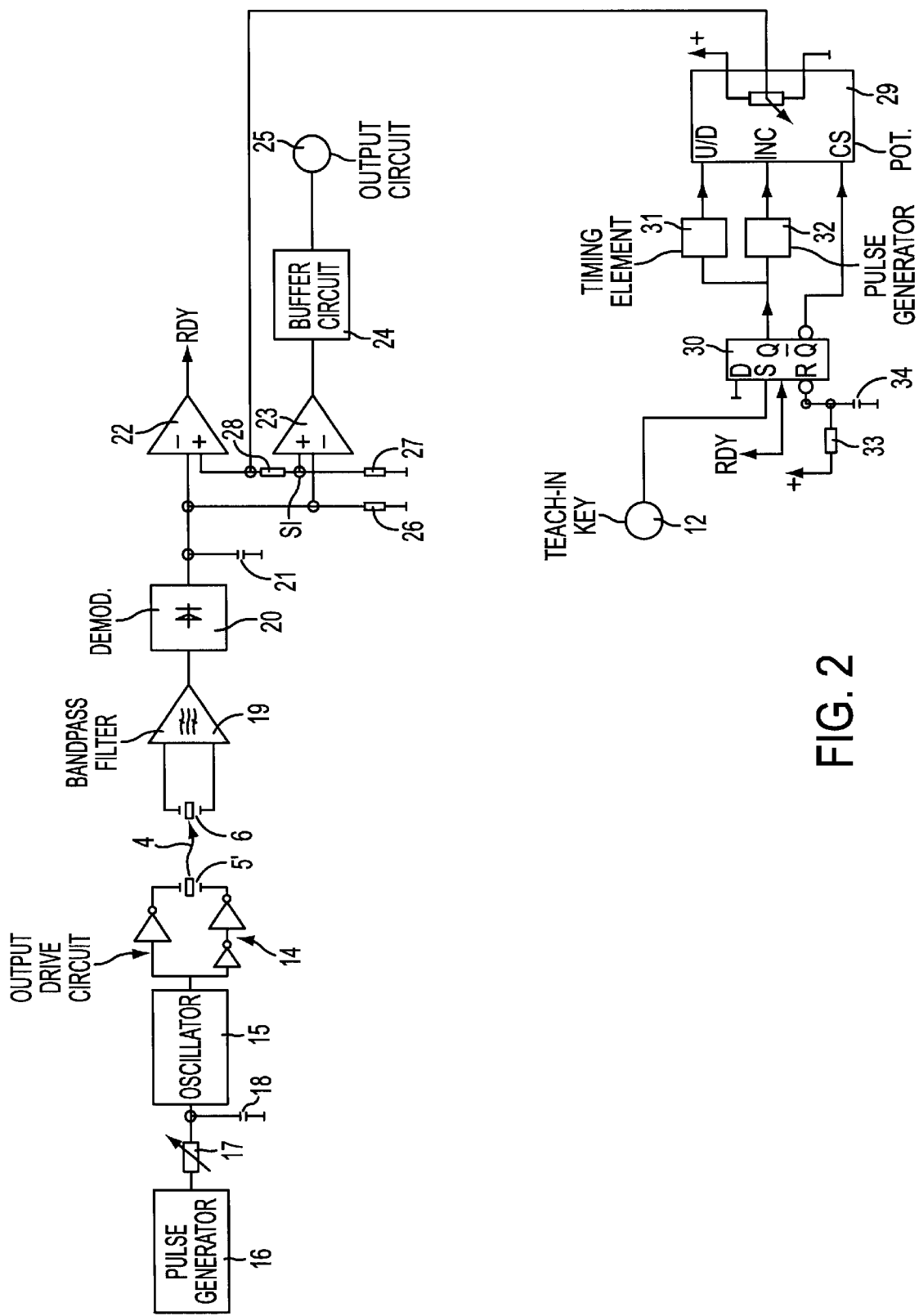
FIG. 2, a first exemplary embodiment of an evaluation circuit for the apparatus according to FIG. 1.

FIG. 2 shows a first embodiment of the evaluation circuit. Transmitter 5 (from FIG. 1) is embodied as an ultrasound generator 5' connected to an output drive circuit 14 having a plurality of inverters fed from an oscillator 15. Oscillator 15 resonantly impulses the ultrasound generator to emit ultrasonic waves 4, whose frequencies are preferably in a range between 200 KHz and 400 KHz. Output drive circuit 14 supplies the necessary power.

Ultrasonic waves 4 are frequency-modulated with the modulation frequency υ by a pulse generator 16, which is connected to oscillator 15 by way of a variable resistor 17 and a capacitor 18.

Ultrasonic waves 4 impact receiver 6 which generates a receiver output signal that is supplied to a band-pass filter 19 and a demodulator 20, to whose output a capacitor 21 is connected.

The filtered, demodulated received signal is supplied to an input of a first comparator 22 and also to an input of a second comparator 23, whose output is connected to an output circuit 25 by way of a buffer circuit 24.

A plurality of resistors 26, 27, 28 are connected on the input side of comparators 22, 23. Resistor 28 is connected in a lead that connects a respective input of comparators 22, 23, and acts as a voltage divider in combination with resistor 27.

A controllable potentiometer 29, such as the nonvolatile digital potentiometer sold by X1CDR, Inc. as part No. X9312 under the tradename $E^2$ POT, iscontrolled via a flip-flop 30 for performing the balancing procedure of apparatus 1. The output Q of flip-flop 30 is connected via a timing element 31 to the input U/D of potentiometer 29, and via a pulse generator 32 to a further input INC of potentiometer 29. The output $\overline{Q}$ of flip-flop 30 is guided to an input CS of potentiometer 20. A resistor 33 and a capacitor 34 are connected to an input R of the flip-flop 30. The teach-in key 12 is connected to a further input S of flip-flop 30. Output signal RDY of first comparator 22 is supplied to a further input of the flip-flop 30. The output of potentiometer 29 is connected to the second input of first comparator 22.

The actuation of teach-in key 12 initiates the balancing procedure of apparatus 1. In the present embodiment, the balancing procedure is performed when a segment of carrier material 2 is stationary between transmitter 5 and receiver 6. For example, a label 3 can be removed from carrier material 2, while this segment of carrier material 2 is held in the space between transmitter 5 and receiver 6. In the use of apparatus 1 to detect sheets, a single sheet is located between transmitter 5 and receiver 6 during the balancing process.

The actuation of teach-in key 12 resets potentiometer 29 to its initial value via flip-flop 30 and timing element 31. The input INC of potentiometer 29 is then activated via pulse generator 32, which increases the resistance of potentiometer 29 in stages, and thus increases the voltage at the input of first comparator 22 in stages until it is identical to the voltage value of the received signal at the other input of comparator 22. As soon as the input voltages at the inputs of comparator 22 are of equal magnitude, a signal change that is fed back to flip-flop 30 occurs at the output (RDY) of comparator 22. This stops the incrementing in $E^2$ potentiometer 29, and the voltage value set in this manner is taken as a reference voltage at the input of comparator 22. This reference voltage is divided via resistors 27 and 28 acting as a voltage divider to a value of about one-half the reference voltage, and is applied to an input of second comparator 23. This voltage value constitutes the magnitude of threshold value S1, to which the received signal is continuously compared during the operating phase of apparatus 1 following the balancing procedure. A specific switching state occurs at output circuit 25, depending on whether the received signal is above or below threshold value S1. The received signal that is above the threshold value S1 and the corresponding switching state at the circuit output 25 corresponds to the detection of carrier material 2. If the received signal is below the threshold value S1, this corresponds to the detection of a label 3 on carrier material 2 with the corresponding switching state at output circuit 25.

Because threshold value S1 is the result of a balancing of the received signal when a segment of carrier material 2 is located between transmitter 5 and receiver 6, the magnitude of threshold value S1 is optimally adapted to the level conditions of the received signals during the subsequent operating phase.

Correspondingly, in sheet detection, the received signal is above the threshold value S1 when a single sheet is detected, and below the threshold value S1 when a multiple sheet is detected.

Figure 3:
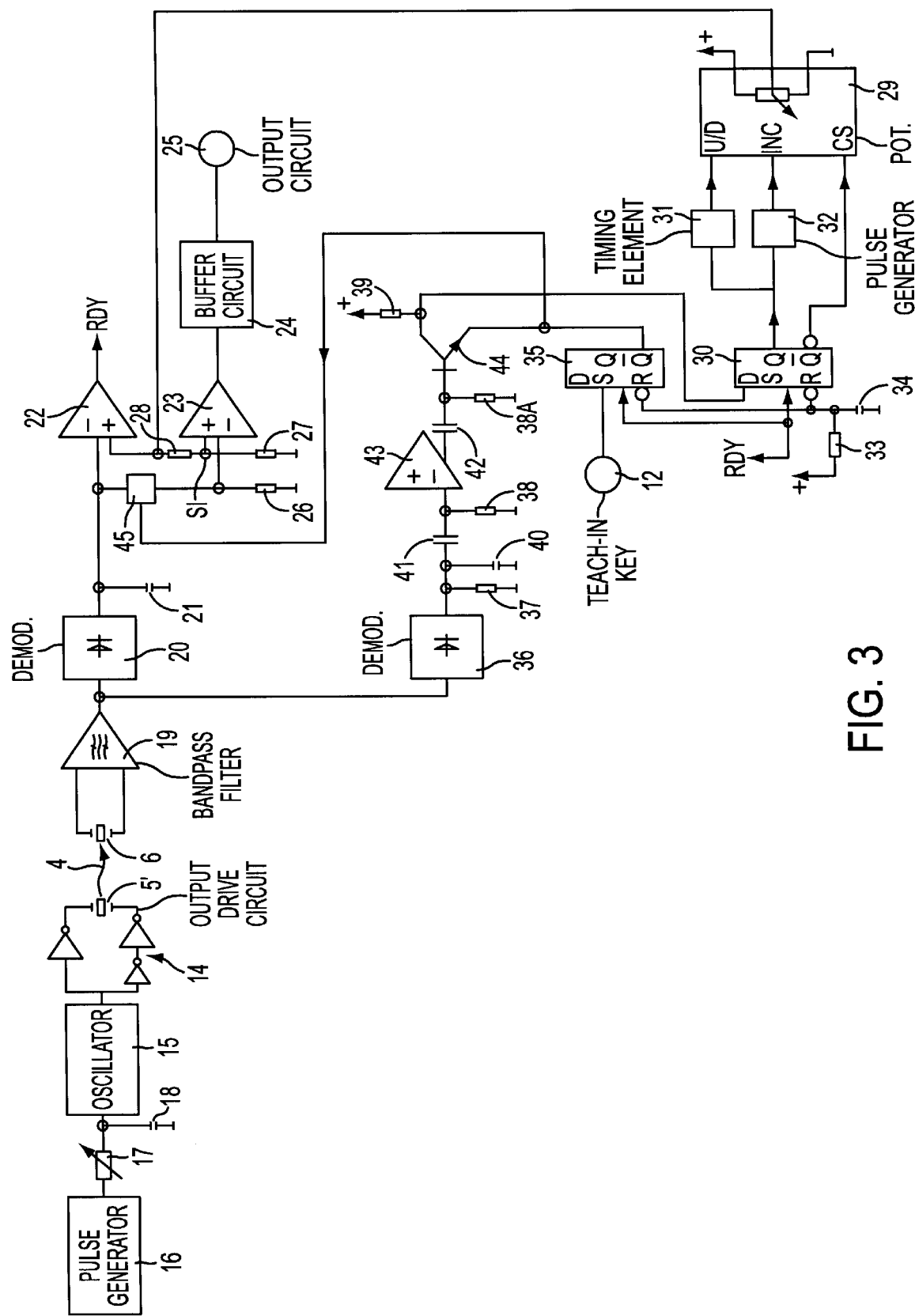
FIG. 3 a second exemplary embodiment of an evaluation circuit for the apparatus according to FIG. 1.

FIG. 3 shows a second embodiment of the evaluation circuit for apparatus 1 of the invention. This embodiment is only employed in label detection, not in sheet detection.

The essential components of this evaluation circuit correspond to those of the evaluation circuit according to FIG. 2. In particular, the wiring of transmitter 5 is identical to that of the embodiment shown in FIG. 2. Also analogously to the embodiment according to FIG. 2, flip-flop 30 is provided for performing the balancing procedure, the flip-flop being connected to $E^2$ potentiometer 29 by way of timing element 31 and pulse generator 32. The output of the potentiometer is guided to first comparator 22. Again, the output signal RDY of the first comparator 22 is supplied to an input of the flip-flop 30.

Also corresponding to the embodiment according to FIG. 2, the reference voltage at first comparator 22 is divided about in half via the voltage divider composed of resistors 27, 28, and applied as a threshold value S1 to an input of second comparator 23, which serves to recognize labels 3, and whose output is connected to output circuit 25.

In contrast to the evaluation circuit according to FIG. 2, in the circuit shown in FIG. 3, teach-in key 12 is connected to an input S of a second flip-flop 35. In further contrast to the evaluation circuit according to FIG. 2, the received signal at the output of band-pass filter 19 is not only supplied to first demodulator 20, but also to a second demodulator 36. A plurality of resistors 37–39 and capacitors 40–42, as well as a third comparator 43 and a transistor 44, are connected to the output of second demodulator 36.

The emitter of transistor 44 is connected to the input $\overline{Q}$ of the second flip-flop 35. The collector of transistor 44 is connected to the input D of first flip-flop 30. A lead also connects the emitter of transistor 44 to an analog switch 45, which is respectively connected to an input of the first and second comparators 22, 23.

These additional switching elements permit a dynamic balancing procedure, during which carrier material 2 is moved, with labels 3, through the space between transmitter 5 and receiver 6. The switching elements represent a peak detector, with which balancing is effected to the value of the received signal obtained in the detection of carrier material 2 without labels 3.

Labels 3 are applied to carrier material 2 one behind the other, with predetermined spacing, in the longitudinal direction of the carrier material. If a label 3 is sensed with ultrasonic waves 4, the waves are attenuated significantly, so the amplitude of the received signal at the output of receiver 6 is accordingly relatively small. If ultrasonic waves 4 are directed at the space between two labels 3 on carrier material 2, the received signal increases temporarily. The width of the peak in the received signal that is obtained in this manner is a function of the width of the space and the speed at which carrier material 2 is moved past transmitter 5 and receiver 6.

The peak detector detects and stores the level of the peak of the received signal. The actuation of teach-in key 12 activates the switching elements of the peak detector via second flip-flop 35.

The actuation of teach-in key 12 sets second flip-flop 35, which switches the emitter of transistor 44 to ground. The demodulated received signal at the output of second demodulator 36 is supplied to third comparator 43 via a dynamic coupling formed by capacitor 41.

Comparator 43 detects the width of the peak of the received signal. The output of third comparator 43 changes from the signal value of "high" to the signal value of "low" at the beginning of the signal peak and, at the end of the peak of the received signal, is reset to the signal value of "high." Thus, the duration for which the signal value of "low" is present at the output of third comparator 43 represents a direct measure of the width of the peak of the received signal, and therefore for the width of the gap between two labels 3 on carrier material 2.

The setting of flip-flop 35 simultaneously opens analog switch 45 via output $\overline{Q}$ of flip-flop 35. Consequently, capacitor 21 can charge to the peak value of the received signal at the output of first demodulator 20, and maintain this value. The signal change at the output of third comparator 43 at the end of the signal peak of the received signal effects a pulse at the collector of transistor 44, which initiates the balancing procedure via potentiometer 29, analogously to the embodiment according to FIG. 2. Because the peak value of the received signal is stored in capacitor 21 at the output of first demodulator 20, it is ensured that the balancing to this peak value takes place. In the process, the balancing procedure and the generation of the threshold value S1 are effected analogously to the embodiment according to FIG. 2.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An apparatus for detecting objects each of which is composed of a label applied to carrier, the apparatus comprising:
    a transmitter for emitting ultrasonic waves;
    a receiver for receiving ultrasonic waves spaced apart from the transmitter so that the objects can be passed between the transmitter and the receiver, the receiver producing an output signal representing an attenuation of ultrasonic waves when one of the objects is between the transmitter and receiver;
    means for comparing the receiver output signal with a threshold value in order to detect the label; and
    balancing means for automatically determining the threshold value as a function of the receiver output signal registered during a balancing procedure when a segment including at least one of the carrier material and the label is located between the transmitter and the receiver.

2. The apparatus according to claim 1, wherein the transmitter emits ultrasonic waves in a frequency range between 200 KHz and 400 KHz along a beam axis.

3. The apparatus according to claim 2, further including a frequency modulator coupled to the transmitter for frequency modulating the ultrasonic waves with a modulation frequency $\upsilon$ in a range of $2\ \text{KHz} \leq \upsilon \leq 5\ \text{KHz}$.

4. The apparatus according to claim 2, wherein the ultrasonic waves have a beam axis that extends at an angle to a surface normal of the respective objects.

5. The apparatus according to claim 4, wherein the ultrasonic waves have a beam axis that extends at an angle $\alpha$ in a range of $5° \leq \alpha \leq 10°$ with respect to a surface normal of the respective objects.

6. The apparatus according to claim 1, wherein the balancing means includes a potentiometer and a first comparator, the first comparator having a first input coupled to the receiver output signal and a second input for receiving an output signal of the potentiometer.

7. The apparatus according to claim 6, further including a first demodulator having an input coupled to the receiver output signal and an output for supplying a demodulated receiver output signal to the first input of the first comparator.

8. The apparatus according to claim 7, further including a second comparator having first and second inputs, the second input being coupled to the receiver output signal; and a voltage divider having a tap coupled to the first input of the second comparator, wherein the output of the potentiometer is varied as a function of the output of the first comparator and constitutes a reference voltage that is balanced against the receiver output signal during the balancing procedure, and the reference voltage is divided via the voltage divider and supplied to the first input of the second comparator and forms the threshold value for evaluating the receiver output signal.

9. The apparatus according to claim 8, wherein the demodulated receiver output signal is coupled to the second input of the second comparator.

10. The apparatus according to claim 9, wherein the carrier material is moved with the labels between the transmitter and the receiver during the balancing procedure.

11. The apparatus according to claim 10, wherein the balancing is affected with a receiver output signal generated in a detection of the carrier material without a label.

12. The apparatus according to claim 11, further including a peak detector for ascertaining the receiver output signal that is generated in the direction of the carrier material.

13. The apparatus according to claim 12, further including a teach-in key actuatable for activating the peak detector.

14. The apparatus according to claim 12, wherein the peak detector includes a second demodulator coupled to the receiver output signal, a third comparator into whose input the receiver output signal that has been demodulated in the second demodulator is coupled, a first flip-flop having an output, a second flip-flop having an output, an analog switch, a transistor connected to the output of the third comparator and having an emitter connected to an output of the second flip-flop, the analog switch being actuatable via the output of the second flip-flop, a capacitor being connected to the output of the analog switch, the capacitor also being connected to the output of the first demodulator and being capable of being charged to a peak value present at the output of the first demodulator, wherein the transistor has a collector connected to an input of the first flip-flop.

15. The apparatus according to claim 14, wherein the balancing procedure performed with the potentiometer is activated via the collector of the transistor.

16. The apparatus according to claim 8, wherein the second comparator has an output connected to an output circuit.

17. The apparatus according to claim 1, wherein the ultrasonic waves penetrate a stationary carrier material without labels during the balancing procedure.

18. The apparatus according to claim 17, further including a teach-in key for initiating the balancing procedure.

19. An apparatus for detecting sheets and to distinguish between single and multiple sheets, the apparatus comprising:
    a transmitter for emitting ultrasonic waves;
    a receiver for receiving ultrasonic waves spaced apart from the transmitter so that sheets can be passed between the transmitter and the receiver, the receiver producing an output signal representing an attenuation of ultrasonic waves when one or more sheets is between the transmitter and receiver;

means for comparing the receiver output signal with a threshold value in order to distinguish between single and multiple sheets; and balancing means for automatically determining the threshold value as a function of the receiver output signal registered during a balancing procedure when at least one of the sheets is located between the transmitter and the receiver.

20. The apparatus according to claim 19, wherein the balancing means includes a potentiometer and a first comparator, the first comparator having a first input coupled to the receiver output signal and a second input for receiving an output signal of the potentiometer.

21. The apparatus according to claim 20, further including a first demodulator having an input coupled to the receiver output signal and an output for supplying a demodulated receiver output signal to the first input of the first comparator.

22. The apparatus according to claim 21, further including a second comparator having first and second inputs, the second input being coupled to the receiver output signal; and a voltage divider having a tap coupled to the first input of the second comparator, wherein the output of the potentiometer is varied as a function of the output of the first comparator and constitutes a reference voltage that is balanced against the receiver output signal during the balancing procedure, and the reference voltage is divided via the voltage divider and supplied to the first input of the second comparator and forms the threshold value for evaluating the receiver output signal.

23. The apparatus according to claim 22, wherein the demodulated receiver output signal is coupled to the second input of the second comparator.

24. The apparatus according to claim 22, wherein the second comparator has an output connected to an output circuit.

25. The apparatus according to claim 19, wherein the ultrasonic waves penetrate an individual sheet during the balancing procedure.

26. The apparatus according to claim 25, further including a teach-in key for initiating the balancing procedure.

27. The apparatus according to claim 19, wherein the sheets are paper sheets.

* * * * *